(No Model.)

C. R. TURNER.
FIFTH WHEEL.

No. 535,232. Patented Mar. 5, 1895.

WITNESSES:
John A. Rennie
H. P. Hutchinson

INVENTOR
C. R. Turner
BY
Munn & Co.
ATTORNEYS.

UNITED STATES PATENT OFFICE.

CALEB R. TURNER, OF BROOKLYN, NEW YORK.

FIFTH-WHEEL.

SPECIFICATION forming part of Letters Patent No. 535,232, dated March 5, 1895.

Application filed October 24, 1894. Serial No. 526,841. (No model.)

*To all whom it may concern:*

Be it known that I, CALEB R. TURNER, of Brooklyn, in the county of Kings and State of New York, have invented a new and Improved Fifth-Wheel, of which the following is a full, clear, and exact description.

My invention relates to improvements in fifth wheels such as are used on vehicles of various kinds and particularly to that class of fifth wheels in which roller bearings are used to enable the vehicle to turn very easily.

The object of my invention is to produce a fifth wheel of this kind, which has comparatively few parts, which has a strong but light roller bearing housed in such a way that it cannot become clogged with dirt and dust and is also shielded from water, which has the housing of the roller bearing formed of angle irons shaped also to serve as bearing plates, and in general to produce a fifth wheel which combines simplicity, cheapness and efficiency to the greatest possible extent.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
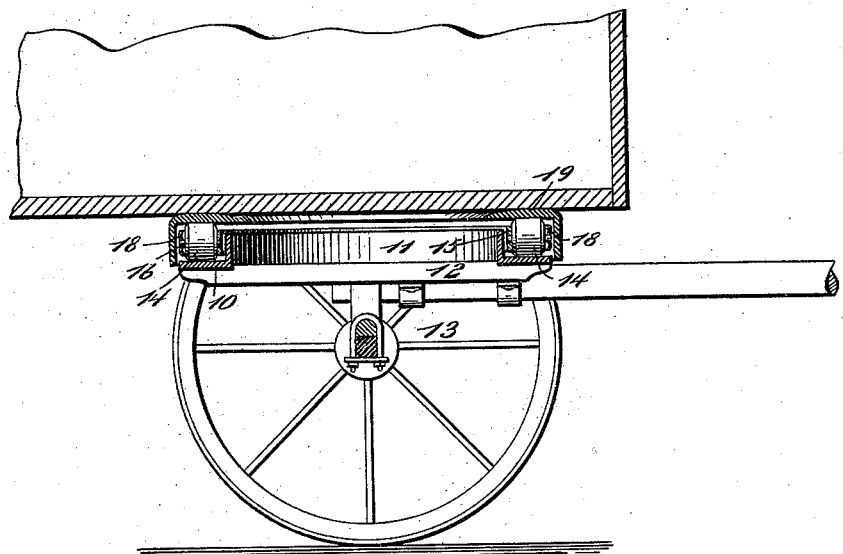
Figure 2:
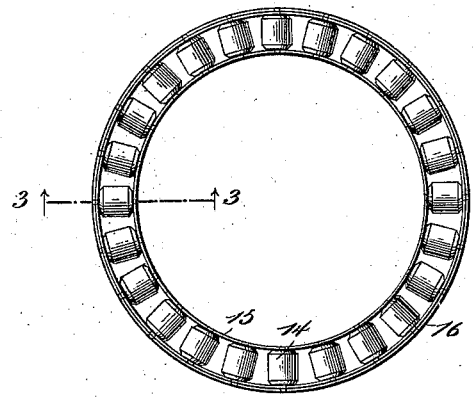
Figure 3:
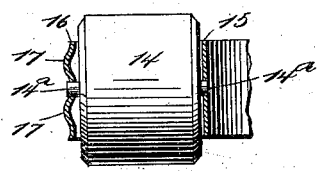

Figure 1 is a cross section of the fifth wheel embodying my invention, showing the same applied to a wagon. Fig. 2 is a plan view of the bearing rollers and their supporting rims; and Fig. 3 is an enlarged cross section on the line 3—3 of Fig. 1.

The fifth wheel has a bottom bearing plate which is of angle iron having one flat surface 10 to serve as the bottom bearing plate and an inner annular flange 11 which serves as a guide for the roller bearing and also forms one side of the housing for the bearing. The bearing plate 10 is supported on a frame 12 which may be of any approved kind and which is connected in the usual manner with the running gear 13 of the vehicle. On the bearing plate 10 are the bearing rollers 14 which are arranged in a circular series, as shown best in Fig. 2, and which ride on the bearing plate 10 and are arranged around the flange 11. The bearing rollers 14 have end trunnions $14^a$ which are journaled in the rims 15 and 16, these being placed concentrically, as shown in Fig. 2, and the outer rim 16 is provided with parallel circumferential ribs 17 which stiffen the rim and enable it to be made out of light material, and the inner rim 15 may be made in the same way if desired.

The rims 15 and 16 are narrower than the height of the rollers 14, so that the rollers project at top and bottom from between the rims 15 and 16. The top bearing plate of the fifth wheel rides on the rollers and forms the second half of the housing, this plate being also angular in cross section and of a generally circular shape, while one part 18 forms the outer side of the housing in which the rollers are held and the other part or half 19 forms the top bearing plate which rides on the rollers.

In certain kinds of vehicles it is necessary to have the top of the fifth wheel convex, and heretofore, it is thought, that no angle iron has been made with one side convex, as shown in Fig. 1, and I claim this as a novel feature of the invention.

The top bearing plate 19 is preferably made to project inward slightly beyond the flange 11 of the lower bearing plate so as to better serve its purpose as a housing top and a little space is left between the flange 11 and the part 19 of the top bearing plate and between the bottom plate 10 of the part 18 of the top bearing plate, so that any water or dust which blows into the housing may pass through the same without materially clogging the rollers 14.

It will be seen that the rollers 14 are held in a way to be accurately guided and so that they cannot be accidentally displaced, and that, by reason of the manner in which the rollers are held between the top and bottom plates of the fifth wheel, the vehicle may be turned with the utmost facility. It will also be noticed that the oppositely arranged angular bearing plates form a housing with the least possible amount of metal.

Having thus described my invention, I claim as new and desire to secure by Letters Patent—

1. A fifth-wheel, comprising oppositely arranged circular angle irons forming respectively the upper and lower bearing plates of the fifth wheel, and a series of rollers arranged between the angle irons, substantially as described.

2. A fifth-wheel, comprising oppositely arranged circular angle irons, forming respectively top and bottom bearing plates of the fifth-wheel and with their side flanges concentrically arranged, and a series of bearing rollers arranged between the angle irons and journaled in concentric rings, substantially as described.

CALEB R. TURNER.

Witnesses:
 A. LUDCOTT,
 WARREN B. HUTCHINSON.